(12) United States Patent
Finkenrath et al.

(10) Patent No.: US 7,966,829 B2
(45) Date of Patent: Jun. 28, 2011

(54) METHOD AND SYSTEM FOR REDUCING $CO_2$ EMISSIONS IN A COMBUSTION STREAM

(75) Inventors: Matthias Finkenrath, Munich (DE); Michael Bartlett, Munich (DE); Stephanie Marie-Noelle Hoffmann, Munich (DE); Narendra Digamber Joshi, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 1233 days.

(21) Appl. No.: 11/609,092

(22) Filed: Dec. 11, 2006

(65) Prior Publication Data

US 2008/0134660 A1 Jun. 12, 2008

(51) Int. Cl.
*F02C 1/00* (2006.01)

(52) U.S. Cl. ....... 60/772; 60/39.52; 60/39.182; 60/39.5; 60/39.41

(58) Field of Classification Search .......... 60/39.52, 60/39.182, 783, 39.5, 772, 39.41
See application file for complete search history.

(56) References Cited

U.S. PATENT DOCUMENTS

| | | | |
|---|---|---|---|
| 5,441,990 A | 8/1995 | Robin et al. | |
| 5,507,860 A | 4/1996 | Rao et al. | |
| 5,637,259 A | 6/1997 | Galuszka et al. | |
| 5,645,891 A | 7/1997 | Liu et al. | |
| 5,724,805 A * | 3/1998 | Golomb et al. | 60/783 |
| 5,772,735 A | 6/1998 | Sehgal et al. | |
| 5,827,569 A | 10/1998 | Akiyama et al. | |
| 5,918,458 A * | 7/1999 | Coffinberry et al. | 60/785 |
| 5,935,533 A | 8/1999 | Kleefisch et al. | |
| 6,033,632 A | 3/2000 | Schwartz et al. | |
| 6,048,472 A | 4/2000 | Nataraj et al. | |
| 6,077,323 A | 6/2000 | Nataraj et al. | |
| 6,090,312 A | 7/2000 | Ziaka et al. | |
| 6,114,400 A | 9/2000 | Nataraj et al. | |
| 6,129,861 A | 10/2000 | Meusinger et al. | |
| 6,228,147 B1 | 5/2001 | Takahashi | |
| 6,237,339 B1 | 5/2001 | Asen et al. | |
| 6,592,641 B2 | 7/2003 | Alvin et al. | |
| 6,655,150 B1 | 12/2003 | Asen et al. | |
| 6,667,022 B2 | 12/2003 | Cole | |
| 6,669,917 B2 | 12/2003 | Lyon | |
| 6,911,057 B2 | 6/2005 | Lyon | |
| 7,258,724 B2 * | 8/2007 | Harazim | 95/39 |
| 7,266,940 B2 * | 9/2007 | Balan et al. | 60/39.181 |
| 2002/0034818 A1 | 3/2002 | Schillig et al. | |

(Continued)

FOREIGN PATENT DOCUMENTS

EP 0831205 3/1998

(Continued)

OTHER PUBLICATIONS

EP Search Report, EP 07122328, Apr. 7, 2008.

(Continued)

*Primary Examiner* — Michael Cuff
*Assistant Examiner* — Craig Kim
(74) *Attorney, Agent, or Firm* — Francis T. Coppa

(57) ABSTRACT

Disclosed herein are systems and methods for reducing power plant $CO_2$ emissions. In one embodiment, a method for reducing emissions in a combustion stream, comprises: combusting a gaseous stream to produce an exhaust stream comprising carbon dioxide, and separating $CO_2$ from the exhaust stream by passing $CO_2$ through a membrane to produce a $CO_2$ product stream and a $CO_2$ lean exhaust stream.

14 Claims, 3 Drawing Sheets

U.S. PATENT DOCUMENTS

| | | | |
|---|---|---|---|
| 2003/0222015 A1 | 12/2003 | Oyama et al. | |
| 2004/0061094 A1 | 4/2004 | Lyon | |
| 2004/0076874 A1 | 4/2004 | Nickel et al. | |
| 2004/0141910 A1 | 7/2004 | Vizoso | |
| 2004/0224396 A1 | 11/2004 | Maston | |
| 2004/0237406 A1 | 12/2004 | Fuder | |
| 2005/0036940 A1 | 2/2005 | Grace et al. | |
| 2005/0172556 A1 | 8/2005 | Powell et al. | |
| 2005/0172811 A1 | 8/2005 | Oyama et al. | |
| 2005/0210881 A1 | 9/2005 | Balan et al. | |
| 2006/0112696 A1 | 6/2006 | Lynghjem et al. | |
| 2006/0260290 A1 | 11/2006 | Rao | |
| 2008/0083226 A1* | 4/2008 | Joshi et al. | 60/772 |
| 2008/0104939 A1* | 5/2008 | Hoffmann et al. | 60/39.5 |

FOREIGN PATENT DOCUMENTS

| | | |
|---|---|---|
| EP | 1159056 B1 | 8/2003 |
| WO | 99/06138 A1 | 2/1999 |
| WO | 02/092500 A1 | 11/2002 |
| WO | 03/080229 A1 | 10/2003 |
| WO | 00/33942 A1 | 11/2006 |
| WO | 0048709 A1 | 12/2006 |

OTHER PUBLICATIONS

Horiuchi et al; "An Estimate of Surface Mobility of $CO_2$ on y-Alumina and MgO-Modified y-Alumina Above 500 K"; Journal of Colloid and Interface Science; 204; pp. 217-218; (1998).

Shen et al; "$CO_2$ Adsorption Over Si-MCM-41 Materials Having Basic Sites Created by Postmodification with $La_2O_3$"; Langmuir; 20; pp. 9130-9137; (2004) Abstract and Full Article.

Rao, et al; "Performance and Pore Characterization of Nanoporous Carbon Membranes for Gas Separation"; Journal of Membrane Science; 110; pp. 109-118; (1996).

Moon et al; "Separation Characteristics of Tetrapropylammoniumbromide Templating Silica/Alumina Composite Membrane in $CO_2/N_2$, $CO_2/H_2$ and $CH_4/H_2$ Systems"; Korean J. Chem. Eng.; 21; pp. 477-487; (2004).

Cho et al; "Separation of $CO_2$ by Modified y-$Al_2O_3$ Membranes at High Temperature"; Journal of Membrane Science; 104; pp. 219-230; (1995).

Kusakabe et al; "Separation of $CO_2$ with $BaTiO_3$ Membrane Prepared by the Sol-Gel Method"; Journal of Membrane Science; 95; pp. 171-177; (1994).

Shih et al; "Development of Mesoporous Membrane Materials for $CO_2$ Separation"; Drexel University, Department of Materials Engineering, Drexel University, Philadelphia, PA 19104; Grant No. DE-FG2600-NT40823; Performance period: Jan. 1, 2001-Dec. 31, 2001 Abstract; 2 pages.

Bredesen et al., "High-Temperature Memebranes in Power Generation with $CO_2$ Capture", Chemical Engineering and Processing 43, pp. 1129-1158 (2004), Received Feb. 24, 2003.

International Publication No. WO02092500, Publication Date Nov. 21, 2002, Abstract Only, 1 page.

International Publication No. WO03080229, Publication Date Oct. 2, 2003, Abstract Only, 1 page.

* cited by examiner

METHOD AND SYSTEM FOR REDUCING $CO_2$ EMISSIONS IN A COMBUSTION STREAM

BACKGROUND

This application relates generally to combustion streams and, more particularly, to reducing $CO_2$ emissions in combustion streams.

Air pollution concerns worldwide have led to stricter emissions standards. These standards regulate the emission of oxides of nitrogen (NOx), unburned hydrocarbons (HC), carbon monoxide (CO), and carbon dioxide ($CO_2$), generated by the power industry. In particular, carbon dioxide has been identified as a greenhouse gas, resulting in various techniques being implemented to reduce the concentration of carbon dioxide being discharged to the atmosphere.

Hence, separation of $CO_2$ from power plants and other commercial plants that generate large amounts of $CO_2$ is desirable. The cost of $CO_2$ capture is generally estimated to represent three-fourths of the total cost of a carbon capture, storage, transport, and sequestration.

As a result, there is a continuing need for $CO_2$ removal technologies, e.g., $CO_2$ removal technologies that can be retrofitted into existing power plants and the like.

BRIEF DESCRIPTION

Disclosed herein are embodiments of power systems, $CO_2$ removal systems, methods for use thereof, and methods for reducing $CO_2$ emissions in a combustion stream.

In one embodiment, a method for reducing emissions in a combustion stream, comprises: producing power in a gas turbine engine assembly, wherein an exhaust stream exits the gas turbine engine assembly, compressing the exhaust stream; and separating $CO_2$ from the exhaust stream by passing the $CO_2$ through a membrane to produce a $CO_2$ product stream and a $CO_2$ lean exhaust stream.

In one embodiment, a power plant, comprises: a gas turbine engine assembly configured to produce power and an exhaust stream comprising $CO_2$; and a $CO_2$ separation unit configured to receive the exhaust stream. The $CO_2$ separation unit comprises a unit compressor in flow communication with a $CO_2$ separation reactor inlet via a unit heat exchanger, and an unit expander in flow communication with the $CO_2$ separation reactor outlet via the unit heat exchanger.

In another embodiment, a method for reducing emissions in a power plant, comprises: producing power in a gas turbine engine assembly, wherein an exhaust stream exits the gas turbine engine assembly; changing an operating pressure of the exhaust stream; changing an operating temperature of the exhaust stream; passing $CO_2$ in the exhaust stream through a membrane in a $CO_2$ separation reactor to produce a $CO_2$ product stream and a $CO_2$ lean exhaust stream; changing a temperature of the $CO_2$ lean exhaust stream to produce a cooled exhaust stream; and cooling air entering the gas turbine engine assembly with the cooled exhaust stream.

In one embodiment, a method for reducing emissions in a combustion stream, comprises: combusting a gaseous stream to produce an exhaust stream comprising carbon dioxide, and separating $CO_2$ from the exhaust stream by passing $CO_2$ through a membrane to produce a $CO_2$ product stream and a $CO_2$ lean exhaust stream.

The above described and other features are exemplified by the following figures and detailed description.

BRIEF DESCRIPTION OF THE DRAWINGS

Refer now to the figures, which are exemplary, not limiting, and wherein like numbers are numbered alike.

DETAILED DESCRIPTION

Carbon dioxide ($CO_2$) emissions from power plants are increasingly penalized by national and international regulations, such as the Kyoto protocol, and the EU Emission Trading Scheme. With increasing cost of emitting $CO_2$, $CO_2$ emission reduction is becoming increasingly important for economic power generation. $CO_2$ removal technologies concentrate on $CO_2$ clean up of the atmospheric flue gas stream of a power plant or other $CO_2$ generating processes, which results in very large, costly and energy intensive $CO_2$ removal units.

Using flue gas recirculation and pressurizing $CO_2$-rich flue gas, increases the partial pressure of $CO_2$ in the power plant flue-gas, thus simplifying the $CO_2$ separation process. The compression also decreases the volume of gas to be treated in the $CO_2$ removal unit; thus reducing the associated capital and energy demands. The present system comprises a $CO_2$ separation unit that has a compressor, expander, heat exchanger, and a $CO_2$ separation reactor. The reactor, which uses $CO_2$ membrane technology, can comprise both carbon monoxide (CO) conversion and $CO_2$ removal capabilities. The present solution is easy to implement on all existing and future power plants, as no integration with the main power system is required. Optionally, still heat recovery from the main power system could be implemented, including heat recovery from the hot gas turbine exhaust gas, or a gas turbine intercooler (if available).

Figure 1:
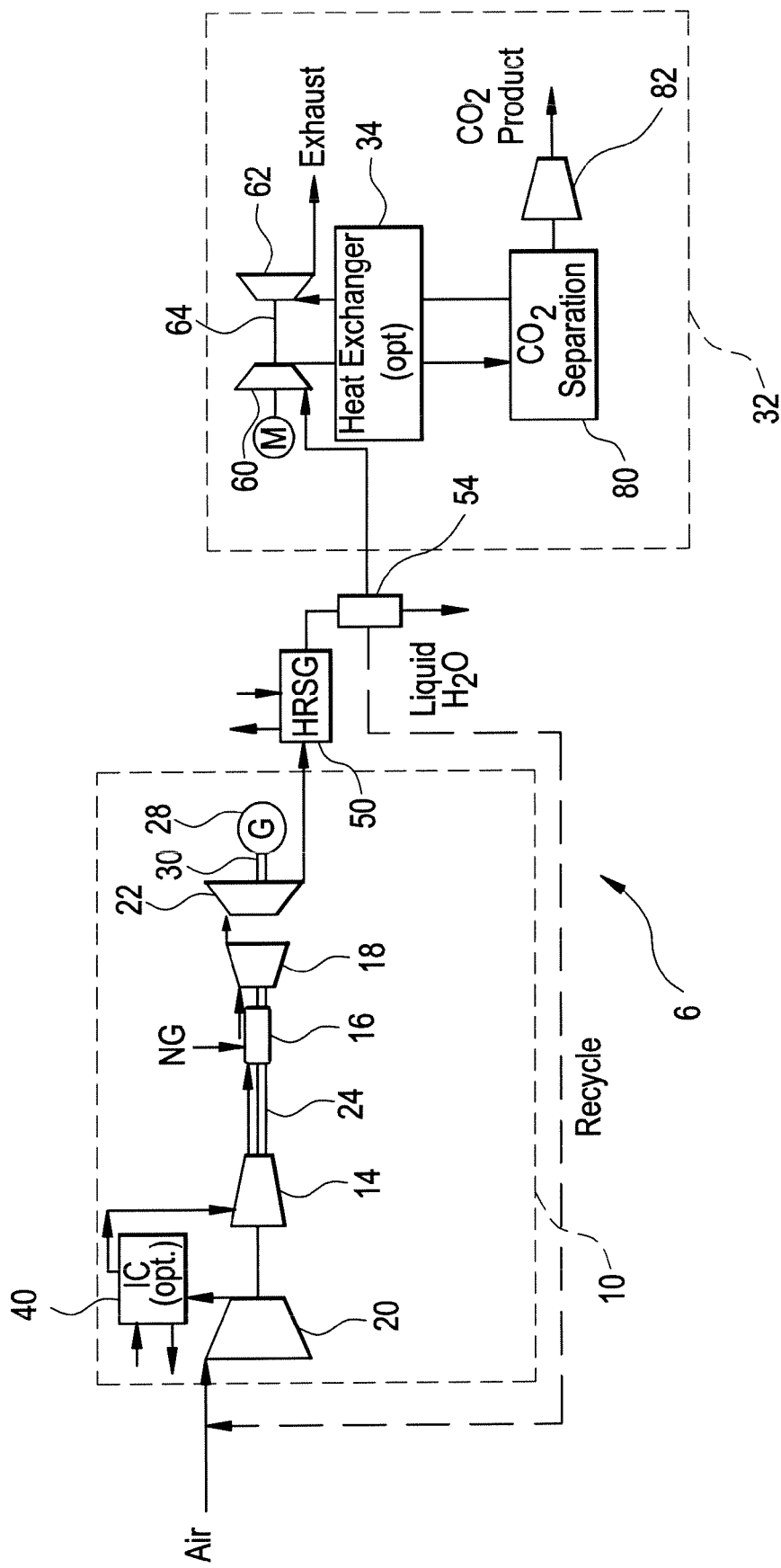
FIG. 1 is a schematic illustration of an exemplary power plant with a $CO_2$ separation unit.

FIG. 1 is a schematic illustration of an exemplary power plant 6 that includes a combustion process (e.g., exemplary gas turbine engine assembly 10). Possible other combustion processes can also, or alternatively, employed, such as a combustor, furnace, and other processes that produce a stream comprising $CO_2$ (e.g., governmentally regulated amounts of $CO_2$)), such as coal-fired power plants, oil-fired boilers, cement or steel factories, and so forth. Gas turbine engine assembly 10 includes a core gas turbine engine 12 that includes compressor(s) (e.g., a high-pressure compressor 14 (e.g., that can compress the stream to pressures of greater then or equal to about 45 bar) and a low-pressure compressor 20 (e.g., that can compress up to about 5 bar)), combustor(s) 16, and turbine(s) (e.g., a high-pressure turbine 18 and a low-pressure turbine 22). High-pressure compressor 14 and high-pressure turbine 18 are optionally coupled by a first shaft 24, and low-pressure compressor 20 can be coupled to an intermediate pressure turbine (not shown) by a second shaft 26. In the exemplary embodiment, low-pressure turbine 22 is coupled to a load, such as a generator 28 via a shaft 30. In the exemplary embodiment, core gas turbine engine 12 is an LMS100 available from General Electric Aircraft Engines, Cincinnati, Ohio.

The gas turbine engine assembly 10 can optionally include an intercooler 40 to facilitate reducing the temperature of the compressed airflow entering high-pressure compressor 14. More specifically, intercooler 40 is in flow communication between low-pressure compressor 20 and high-pressure compressor 14 such that airflow discharged from low-pressure compressor 20 is cooled prior to being supplied to high-pressure compressor 14. In the exemplary embodiment, intercooler 40 is a water-to-air heat exchanger that has a working fluid (not shown) flowing therethrough. For example, the working fluid can be raw water that is channeled from a body of water located proximate to power plant 8, such as a lake, for example. Optionally, intercooler 40 is an air-to-air heat exchanger that has a cooling airflow (not shown) flowing therethrough.

Power plant 6 also optionally includes a heat recovery steam generator (HRSG) 50 that is configured to receive the relatively hot exhaust stream discharged from the gas turbine engine assembly 10 and transfer this heat energy to a working fluid flowing through the HSRG 50 to generate steam which, in the exemplary embodiment, can be used to drive a steam turbine 52. (See FIG. 2) A condenser 54 can be located downstream from HSRG 50 to substantially remove the water vapor from the exhaust stream discharged from HSRG 50 by lowering the gas temperature. A dehumidifier (not shown) can also be employed downstream of the HRSG 50 and upstream of the condenser 54, to facilitate water removal from the exhaust stream. The dehumidifier can comprise a desiccant air drying system.

The power plant 6 further includes an exemplary $CO_2$ separation unit 32. The $CO_2$ separation unit 32 comprises a second low-pressure compressor 60, an expander 62, and a shaft 64 used to couple second low-pressure compressor 60 to expander 62. Expander, as used herein, can be a centrifugal or axial flow turbine through which a high-pressure gas is expanded to produce work that can be used to drive a compressor, such as low-pressure compressor 60. Expander 62 (also referred to as a turbo-expander or expansion turbine) is connected to a prime mover 66 (see FIG. 2), such as an electric motor, a gas turbine, a reciprocating engine, or so forth, via a shaft 68. As such, prime mover 66 is utilized to drive the low-pressure compressor 60, assisted by the expander 62, as will be discussed below. Optionally, desiccant air drying system(s) can be used in the $CO_2$ separation unit 32, e.g., downstream of the $CO_2$ separation reactor 80, downstream of the intercooler 34.

The power plant 8 can also include a second intercooler or heat exchanger 70 (see FIG. 2) that is in flow communication with low-pressure compressor 60 and expander 62. In operation, the exhaust stream discharged from low-pressure compressor 60 is channeled through intercooler 70 to provide cooling prior to the exhaust stream being supplied to $CO_2$ separation unit 80 and the expander 62. In the exemplary embodiment, intercooler 70 is a water-to-air heat exchanger that has a working fluid (not shown) flowing therethrough. For example, as discussed above, the working fluid can be raw water that is channeled from a body of water located proximate to power plant 8. Optionally, the cool water may also be generated using a wet cooling tower, and/or intercooler 70 can be an air-to-air heat exchanger that has a cooling airflow (not shown) flowing therethrough. The exhaust stream discharged from expander 62 can then be supplied to a third heat exchanger 72 to facilitate reducing the operational temperature of the inlet air supplied to gas turbine engine assembly 10, as will be discussed below.

During operation, ambient air drawn into the gas turbine is channeled through heat exchanger 72 to facilitate reducing the operational temperature of the ambient air being supplied to gas turbine engine assembly 10. Gas turbine engine assembly 10 is operated as known in the art, and as such, produces an exhaust stream having a temperature of about 600 degrees Fahrenheit (° F.) (316 degrees Celsius (° C.)) to about 1,300° F. (704° C.). The exhaust stream discharged from gas turbine engine assembly 10 is channeled through HRSG 50 wherein a substantial portion of the heat energy from the exhaust stream is transferred to a Rankine cycle, with the working fluid channeled therethrough to generate steam that as discussed above, that can be utilized to drive steam turbine 52. HSRG 50 facilitates reducing the operational temperature of the exhaust stream to a temperature that is about 75° F. (24° C.) and about 248° F. (120° C.). In the exemplary embodiment, HSRG 50 facilitates reducing the operational temperature of the exhaust stream to a temperature that is approximately 100° F. (38° C.). In other embodiments, the exhaust stream can be simply cooled without utilizing the heat rejected to useful purpose, and/or it can be linked to another process to provide heat in the form of steam or hot water. In one embodiment, the exhaust stream can also be channeled through additional heat exchangers (not shown) to further condense water from the exhaust stream, which water is then discharged through condenser 54, for example.

Figure 2:
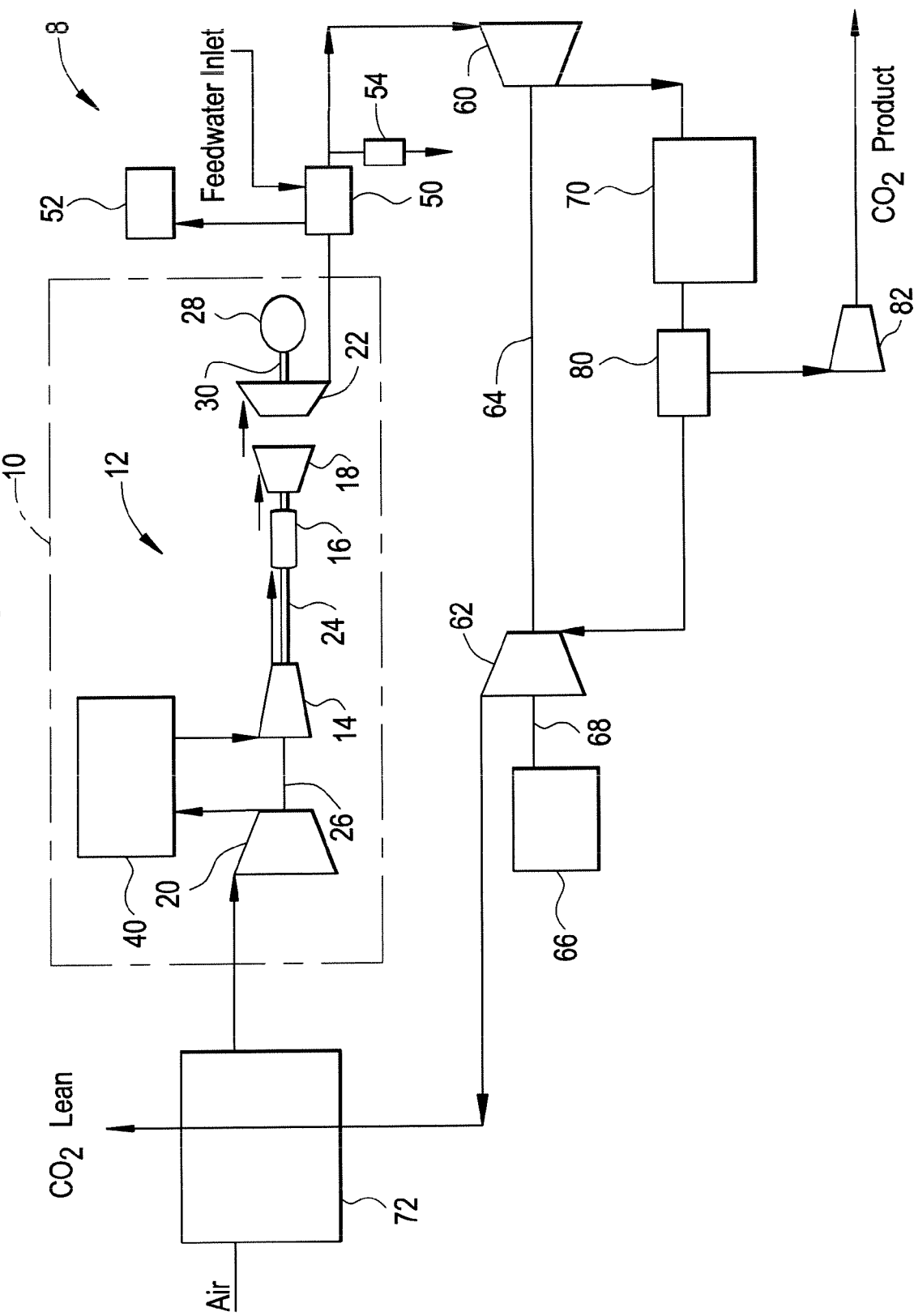
FIG. 2 is a schematic illustration of another embodiment of a power plant with a $CO_2$ separation unit.

As is illustrated in FIG. 1, in the configuration shown in FIG. 2, upstream of compressor 60, a fraction of the exhaust gas can optionally be recirculated back and to the main gas turbine engine assembly 10; e.g., about 30 vol % to about 70 vol % of the exhaust stream can be recycled to enter the gas turbine engine assembly with the air). The mixing of the recirculated exhaust gas and the fresh air can take place up or downstream of optional heat exchanger 72. Recirculating a fraction of the exhaust stream to the inlet of gas turbine engine assembly 10 increases the $CO_2$ concentration in the working fluid, thereby increasing the driving forces for the $CO_2$ separation in $CO_2$ separation reactor 80. In addition, exhaust gas recirculation can help to lower other combustion emissions, such as lowering the formation of NOx.

The relatively cool dry exhaust stream is then compressed in an optional second low-pressure compressor 60, which in the exemplary embodiment, is driven by expander 62, and prime mover 66, if needed. Second low-pressure compressor 60 can be utilized to increase the operating pressure of the exhaust stream channeled therethrough to a pressure that is approximately four times greater than the operating pressure of the exhaust stream discharged from gas turbine engine assembly 10. Moreover, channeling the exhaust stream through the second low-pressure compressor causes the temperature of the exhaust stream to increase. The exhaust stream discharged from second low-pressure compressor 60 is then optionally channeled through a second intercooler 70 to facilitate reducing the operational temperature of the exhaust stream, if advantageous for operating the $CO_2$ separation reactor 80 and/or the system. In the exemplary embodiment, second intercooler 70 facilitates reducing the operational temperature of the exhaust stream to a temperature that is about 100° F. (38° C.).

The $CO_2$ rich exhaust stream discharged from intercooler 70 enters the $CO_2$ separation reactor 80. $CO_2$ separation reactor 80 can comprises various $CO_2$ separation processes such as $CO_2$ selective membrane technologies, sorption processes (adsorption and/or absorption), diaphragms, cryogenic processes, and so forth, as well as combinations comprising at least one of the foregoing processes. The membranes can be sealed from the flow of the exhaust stream in any fashion that optionally enables a sweep gas to remove the $CO_2$ without entering the exhaust stream. For example, the $CO_2$ passes through walls of the membrane to an enclosed area on the other side of the membrane, while the exhaust stream continues through the reactor. The sweep gas enters the enclosed area, passing by the membranes and removing the $CO_2$ that has pass through the walls of the membranes. The sweep gas optionally carries the $CO_2$ out of the reactor through a separate exit than the remainder of the exhaust stream.

The membrane(s) are $CO_2$ selective and thus continuously remove the $CO_2$ produced, including $CO_2$ which is optionally produced from CO in catalyst portion(s), which can be added to the membrane if required. The membrane can comprise any membrane material that is stable at the operating conditions and has the required $CO_2$ permeability and selectivity at the operating conditions. Possible membrane materials that are selective for $CO_2$ include certain inorganic and polymer materials, as well as combinations comprising at least one of these materials. Inorganic materials include microporous carbon, microporous silica, microporous titanosilicate, microporous mixed oxide, and zeolite materials, as well as combinations comprising at least one of these materials. Some possible membrane materials are described in U.S. patent application Ser. No. 11/263,165, to Ruud et al., filed on Oct. 31, 2005.

While not to be limited by a particular theory, mechanisms for $CO_2$ selectivity in microporous materials include surface diffusion and capillary condensation. A material that has an affinity for $CO_2$ relative to other gases in a stream will show a preferred adsorption and surface diffusion of $CO_2$. Furthermore, the presence of the adsorbed $CO_2$ molecules, through capillary condensation, will effectively block the pore from the more weakly adsorbing gases, thereby hindering their transport. The gas selectivity through the membrane is determined by the relative contributions of Knudsen flow and surface diffusion to the total transport of gas. For example, to achieve $CO_2$ selectivity, surface diffusion must make a significant contribution to the total $CO_2$ transport. The rate of surface diffusion depends on the amount of $CO_2$ adsorbed and its relative mobility.

To a first approximation, the surface diffusivity of a gas on a material can be estimated from the heat of adsorption. Since the diffusivity varies exponentially with the negative of the heat of adsorption, materials with lower heats of adsorption exhibit higher surface diffusivity. Physically, this means that materials suitable for functional materials have a greater affinity for $CO_2$ than for other gases in the stream, but the affinity for $CO_2$ is not so great that the $CO_2$ binds to the surface without transporting through the pore channel. Low heats of adsorption correspond to weakly bonded $CO_2$, which favors high diffusivities. Accordingly, materials that are suitable for use as the functional material are characterized by high surface coverage derivative ($d\theta/dp$) and low heat of adsorption ($\Delta H$). These properties can be determined from $CO_2$ adsorption isotherms of the materials and appropriate materials can be chosen. In an exemplary embodiment, the ceramic comprises a material such as $SiO_2$, $BaTiO_3$, $BaZrO_3$, $LaFeO_3$, as well as combinations comprising at least one of these materials. These oxides theoretically show substantially high mobility for surface diffusion of $CO_2$ and hence can provide the required permeability.

In practice, the membrane often comprises a separation layer that is disposed upon a support layer. For asymmetric inorganic membranes, the porous support can comprise a material that is different from the separation layer. Support materials for asymmetric inorganic membranes include porous alumina, titania, cordierite, carbon, silica glass (e.g., Vycor®), and metals, as well as combinations comprising at least one of these materials. Porous metal support layers include ferrous materials, nickel materials, and combinations comprising at least one of these materials, such as stainless steel, iron-based alloys, and nickel-based alloys. Polymeric membranes can be disposed on polymeric or inorganic supports. Membranes can include polymeric materials such as polyethers and polyether blends and hybrid membranes such as silanized gamma-alumina membranes. Silanes, such as 2-acetoxyethyl, 2-carbomethoxyethyl and 3-aminopropyl, can be integrated with ceramic membranes to achieve selective $CO_2$ transport.

The $CO_2$ lean exhaust stream discharged from the $CO_2$ separation reactor 80 can optionally expanded through expander 62 which extracts work from the pressurized exhaust gases to drive low-pressure compressor 60, thus reducing the temperature of the exhaust stream substantially. For example, in one embodiment, the temperature of the exhaust stream discharged from expander 62 is about 30° F. (−1° C.) to about −30° F. (−34° C.). In the exemplary embodiment, the temperature of the exhaust stream discharged from expander 62 is approximately −20° F. The relatively cooler exhaust stream can then be channeled through heat exchanger 72 to facilitate cooling the inlet air stream, and to facilitate increasing the air density of the airflow that is channeled to gas turbine engine assembly 10, thus increasing the efficiency and power output of the core gas turbine engine 12. As a result, the reduction in the inlet temperature of the air flow to the gas turbine increases its mass flow and efficiency reducing the economic impact of the $CO_2$ separation process.

Figure 3:
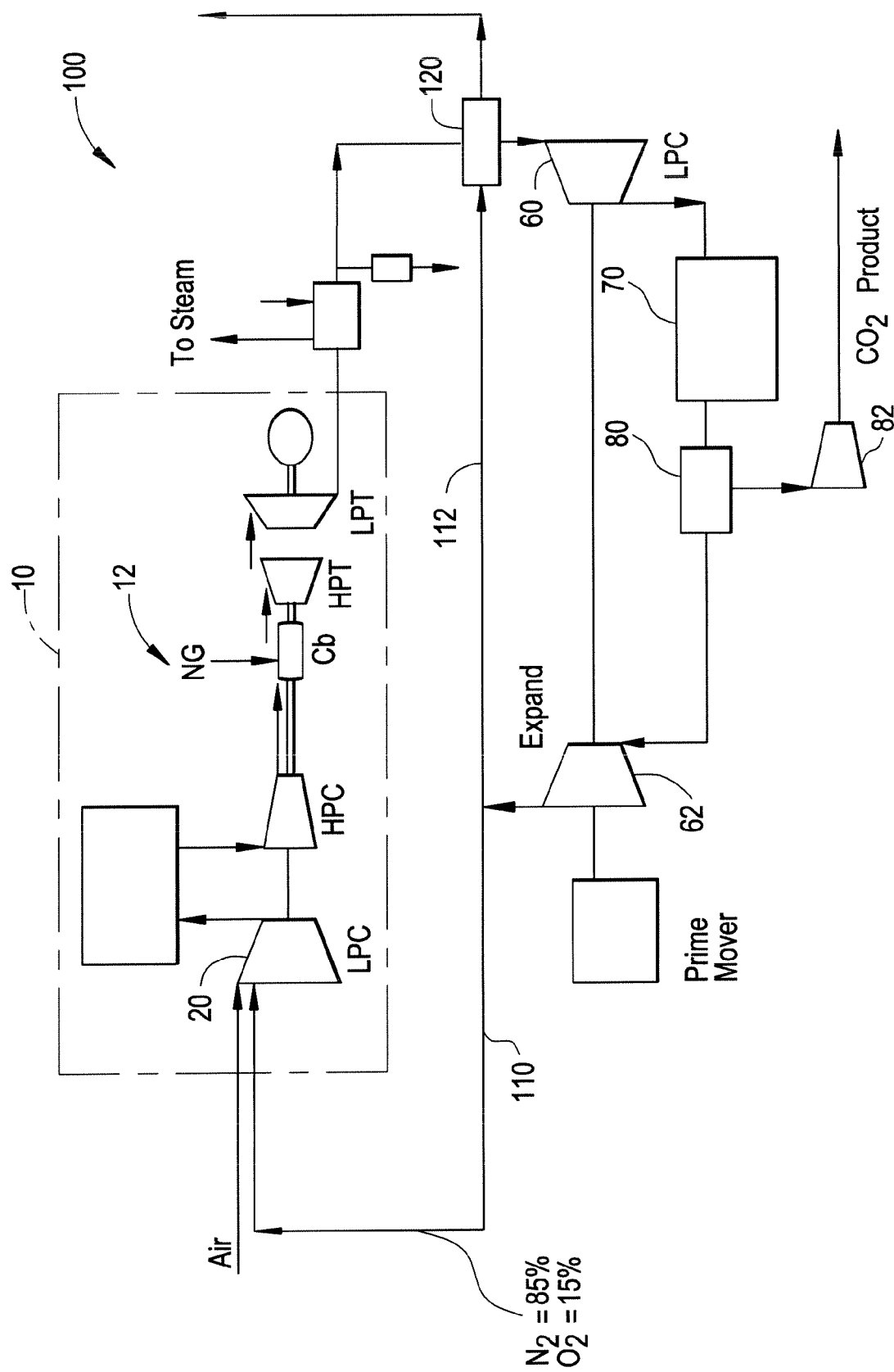
FIG. 3 is a schematic illustration of yet another embodiment of a power plant with a $CO_2$ separation unit.

FIG. 3 is a schematic illustration of another exemplary power plant 100. Power plant 100 is substantially similar to power plant 8, shown in FIG. 2. In the exemplary embodiment, power plant 100 does not include heat exchanger 72, rather the relatively cool dry exhaust stream discharged from expander 62 is separated into a first air stream portion 110 that is discharged directly into the inlet of gas turbine engine assembly 10 and a second air stream portion 112 that is channeled through a heat exchanger 120 that is positioned upstream from second low-pressure compressor. Optionally, prior to entering the gas turbine assembly 10, moisture can be removed from the first air stream portion 110 and/or the inlet airflow utilizing desiccant air drying system(s).

During operation, the first air stream 110 is channeled directly into the inlet air stream supplied to gas turbine engine assembly 12. More specifically, any moisture still entrained within incoming fresh air stream is condensed into relatively small or microscopic droplets which produces a fine fog or mist, when mixed with the air stream 110. The fog or mist is then channeled into low-pressure compressor 20 wherein the droplets evaporate to facilitate reducing the operational temperature of the airflow supplied to core gas turbine engine 12. As a result, the temperature of the airflow channeled into the core gas turbine engine 12 is decreased, thus reducing the work required in the compression process and increasing the overall efficiency of the gas turbine engine assembly 10. The oxygen content of the stream 110 is reduced due to the combustion process in the gas turbine 10. The mixing of this stream with fresh air results in a net reduction of oxygen content of the combustion air in combustor 16 facilitating reduction of NOx formation in the combustor.

The second air stream portion 112 can be channeled through heat exchanger 120 to facilitate removing heat energy from the exhaust stream channeled into second low-pressure compressor 60 and to facilitate condensing and removing water entrained in the exhaust air stream prior to the exhaust air stream entering second low-pressure compressor 60.

Described herein is a method and system for reducing power plant emissions and also increasing power plant efficiency. The method includes increasing separating substantially all the $CO_2$ entrained within the exhaust gas using a $CO_2$ separation reactor where CO in the exhaust stream is converted to $CO_2$, and the $CO_2$ is removed through $CO_2$ selective membranes, to produce a $CO_2$ lean stream. The $CO_2$ lean stream can be exhausted and/or can be recycled to the gas turbine engine assembly. This can be accomplished by using the exhaust stream from the gas turbine engine assembly without increasing the pressure and/or decreasing the temperature. For example, the exhaust stream can be treated in the $CO_2$ separation reactor at a temperature of about 250° C. to about 500° C. (e.g., about 300° C. to about 450° C.), and a pressure of about less than 5 bar (0.5 megapascals (MPa); e.g., more particularly, about 1 bar to about 4 bar (about 0.1 MPa to about 0.4 MPa)). Furthermore, the $CO_2$ lean stream from the $CO_2$ separation reactor can pass directly to the expander (e.g., turbine), e.g., without passing through a heat exchanger. This process, even with compressing to about 5 bars, can remove greater than or equal to about 80 vol % of the $CO_2$ in the exhaust stream, or, more specifically, about 80 vol % to about 90 vol % of the $CO_2$ in the exhaust stream can be removed.

Additional advantages include the fact that there is no need of integration of the compressor-expander unit into the main power system; the present system is capable of being retrofitted into existing systems with $CO_2$ capture. The retro-fitability is not limited to power cycles based on gas turbines, but can be applied to any combustion process generating $CO_2$. Optionally the heat exchanger can be integrated with the main power system. This could lead to a reduction of the power requirement needed to drive the compressor-expander unit, or even help to make it energy self-sustainable. This then reduces or eliminates the need for having a (large) prime mover or motor. Alternatively, or in addition, optional re-heat within the compressor-expander unit by a heat exchanger or similar (which is shown in the drawing) can be used and/or other heat recovery strategies and humidification can be used advantageously to minimize the power demand within the compressor-expander unit. Humidification of the working fluid after compression can be applied to utilize process heat and increase the mass flow of the fluid, thereby increasing the overall efficiency of the cycle and leading to an increased power generation in the expander section when expanding the $CO_2$ lean working fluid.

In contrast to re-heat, the pressurized working fluid in the compressor-expander can optionally be cooled down, and can be expanded to atmospheric pressure after the $CO_2$ removal. In this case, the cool (very low or even sub-zero temperatures) expanded working fluid can be used for inlet chilling of the inlet flow into the main gas turbine.

Ranges disclosed herein are inclusive and combinable (e.g., ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and can or can not be present in other embodiments. In addition, it is to be understood that the described elements can be combined in any suitable manner in the various embodiments.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While the invention has been described with reference to a preferred embodiment, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for reducing emissions in a combustion stream, comprising:
producing power in a gas turbine engine assembly, wherein an exhaust stream exits the gas turbine engine assembly;
compressing the exhaust stream exiting the gas turbine engine assembly in a first compressor of a $CO_2$ separation unit;
separating $CO_2$ from the exhaust stream by passing the exhaust stream through a membrane to produce a $CO_2$ product stream and a $CO_2$ lean exhaust stream;
expanding the $CO_2$ lean exhaust stream in an expander of the $CO_2$ separation unit to produce a cooled $CO_2$ lean exhaust stream; and
cooling air that is entering a second compressor of the gas turbine engine assembly, by passing the cooled $CO_2$ lean exhaust stream through a heat exchanger, with the air entering the second compressor.

2. The method of claim 1, wherein an operating pressure of the exhaust stream is adjusted to a pressure of less than or equal to about 0.5 MPa prior to introduction to a $CO_2$ separation reactor of the $CO_2$ separation unit.

3. The method of claim 1, further comprising, recycling a portion of the exhaust stream to the gas turbine engine assembly prior to introducing a remaining portion of the exhaust stream to a $CO_2$ separation reactor of the $CO_2$ separation unit.

4. The method of claim 1, further comprising prior to compressing the exhaust stream, recovering heat from the exhaust stream in a heat recovery steam generator to reduce the operating temperature of the exhaust stream.

5. The method of claim 4, further comprising, prior to introducing the exhaust stream to a $CO_2$ separation reactor of the $CO_2$ separation unit and after compressing the exhaust stream, reducing an operating temperature of the exhaust stream in an intercooler.

6. The method of claim 5, further comprising adjusting a temperature of the $CO_2$ lean exhaust stream in the intercooler.

7. The method of claim 1, further comprising removing moisture from an inlet airflow to the gas turbine engine assembly.

8. The method of claim 1, further comprising reducing the moisture content within the $CO_2$ lean exhaust stream.

9. The method of claim 1, further comprising separating the $CO_2$ lean exhaust stream into a first portion and a second portion, and combining the first portion of the $CO_2$ lean exhaust stream with air entering the gas turbine engine assembly.

10. The method of claim 9, further comprising cooling the exhaust stream with the second portion prior to introducing the exhaust stream to the $CO_2$ separation reactor.

11. A method for reducing emissions in a combustion stream, comprising:
   combusting a gaseous stream in a combustor to produce an exhaust stream comprising carbon dioxide;
   introducing the exhaust stream to a $CO_2$ separation reactor of a $CO_2$ separation unit, wherein within the $CO_2$ separation reactor the $CO_2$ separates from the exhaust stream by passing through a membrane to produce a $CO_2$ product stream and a $CO_2$ lean exhaust stream; and
   separating the $CO_2$ lean exhaust stream into a first portion and a second portion, and combining the first portion of the $CO_2$ lean exhaust stream with air entering the gas turbine engine assembly;
   expanding the $CO_2$ lean exhaust stream in an expander of the $CO_2$ separation unit to produce a cooled $CO_2$ lean exhaust stream; and
   cooling air that is entering a second compressor of the gas turbine engine assembly by passing the cooled $CO_2$ lean exhaust stream through a heat exchanger, with the air entering the gas turbine engine assembly.

12. The method of claim 11, further comprising recycling a portion of the exhaust stream to the second compressor prior to introducing a remaining portion of the exhaust stream to the $CO_2$ separation reactor.

13. The method of claim 11, further comprising reducing the moisture content within the $CO_2$ lean exhaust stream.

14. A method for reducing emissions in a combustion stream, comprising:
   combusting a gaseous stream in a combustor to produce an exhaust stream comprising carbon dioxide;
   recycling a portion of the exhaust stream to the combustor prior to introducing a remaining portion of the exhaust stream to a $CO_2$ separation reactor of a $CO_2$ separation unit;
   introducing the exhaust stream to a $CO_2$ separation reactor, wherein within the $CO_2$ separation reactor the $CO_2$ separates from the exhaust stream to produce a $CO_2$ product stream and a $CO_2$ lean exhaust stream;
   wherein the $CO_2$ separates from the gas stream using a cryogenic process or a combination of the cryogenic process, and at least one method selected from a group consisting of a $CO_2$ selective membrane, and a diaphragm;
   expanding the $CO_2$ lean exhaust stream in an expander of the $CO_2$ separation unit to produce a cooled $CO_2$ lean exhaust stream; and
   cooling air entering a second compressor of the gas turbine engine assembly by passing the cooled $CO_2$ lean exhaust stream through a heat exchanger, with the air entering the gas turbine engine assembly.

* * * * *